United States Patent Office 3,060,558
Patented Oct. 30, 1962

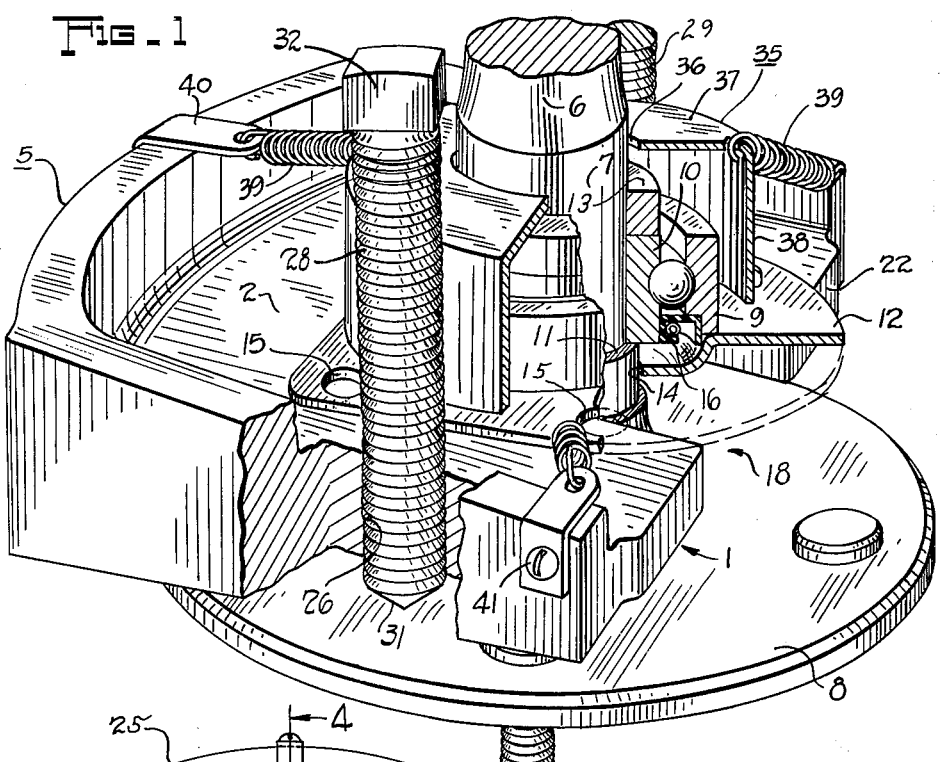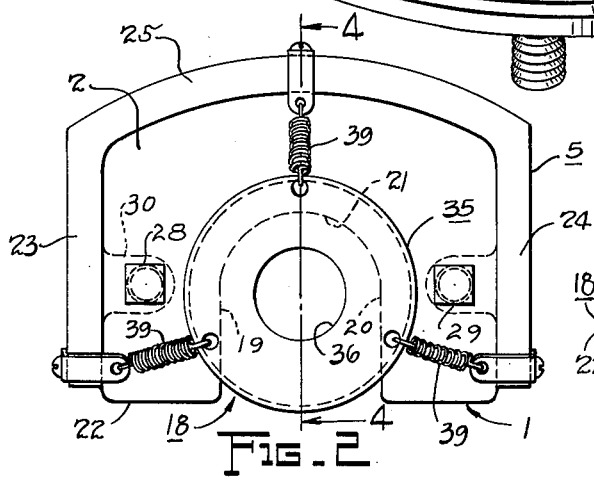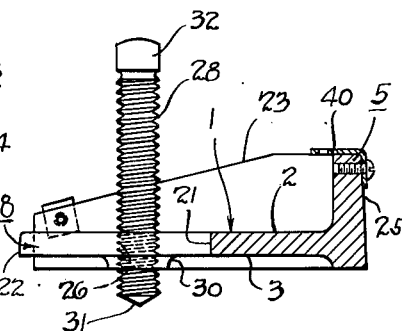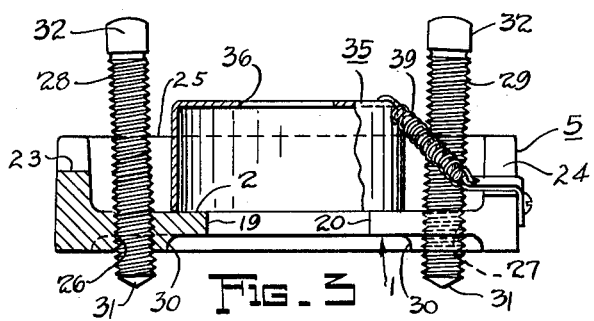
INVENTOR.
SOL J. LEVENSON
BY Bosworth, Sessions,
Herrstrom and Knowles
ATTORNEYS.

3,060,558
DEVICE FOR REMOVING PRESS FITTED
AXLE BEARINGS
Sol J. Levenson, 2641 Idlewood Ave.,
Cleveland Heights, Ohio
Filed July 30, 1958, Ser. No. 752,071
6 Claims. (Cl. 29—256)

This invention relates to mechanical tools and is particularly concerned with a specialized bearing removing device that is cheap and small and can be readily, easily and conveniently used by any automobile mechanic for the purpose of disassembling a bearing unit from the drive axle on which it is press fitted.

Modern automotive vehicles have divided rear drive axles, the two axle halves each extending outwardly from the differential to which the inner ends of the axles are drivingly connected. The drive axles are enclosed in tubular housings fast at their inner ends to a housing that encloses the differential. At their outer ends the tubular housings are bored to receive the outer races of ball bearings; the inner races of the bearings are press fitted on the drive axles adjacent the outer ends of the latter. The drive axles terminate in circulate plates disposed outside and beyond the extremities of the tubular housings. The brake drums and wheels of the vehicle are attached as by bolts or studs to such plates. Closure plates are located between the end plates on the drive axles and the bearing units. The outer ends of the drive axles project through apertures in such closure plates and the plates are fast as by screws to and over the ends of the axle housings. The bearing units or the closure plates carry oil seals which either confine lubricant to the space between the bearing races or prevent lubricant flowing outwardly along the driving axles to the bearings from passing the bearing units and escaping out the axle housings through the openings in the closure plates.

Considerable difficulty has been experienced in removing the bearing unit of such an assembly from the cylindrical bearing receiving portion of the axle on which the inner race is press fitted. Such disassembly is required to replace either the bearing or the lubricant seal should one of these parts become damaged or worn. Various procedures have been used to force the press fitted bearing units off the axles, including prying with levers and fixturing in arbor presses. The former is objectionable in that it is uncertain and dangerous; the latter is costly and cumbersome.

It is therefore the principal object of the present invention to provide a simple and inexpensive tool for pressing a bearing unit from such an axle assembly, which tool is small and compact, can be easily carried about in the tool kit of an auto mechanic and is safe and easy to operate. More particularly, the invention provides a tool for removing the bearing of such an assembly which tool is in the form of a yoke adapted to be inserted between the axle end plate and the bearing in straddling relation to the axle and which carries screw means adapted to react against the end plate in such a way as to urge the yoke against the bearing and force the latter off the axle. According to the preferred version of the invention, the tool incorporates a generally flat thin body member that has a slot opening through an unobstructed wide forward edge to receive the axle; the body member carries a pair of screws located on opposite sides of the slot and adapted to be actuated in unison to apply an axial thrust to the end plate of the axle.

As another object and as a further refinement of the preferred embodiment, the flat body member is embraced by a yoke-shaped reinforcement or flange means which is continuous about the side and rear edges of the body member and is discontinuous across the forward edge through which the axle receiving slot opens.

A further object is to provide such a tool which incorporates a safety device in the form of a protective shield that encompasses the bearing unit during removal of the latter so as to confine any fragments of the bearing unit that result from shattering of the bearing during removal, should such an accident occur. As a further refinement of this aspect of the invention, the protective shield is yieldingly attached to the body of the tool as by spring means to maintain a snug fit between the protective shield and the parts of the bearing assembly, the spring means being adapted to bias the shield toward the bearing unit and the axle end plate during disassembly.

Other objects and advantages relate to certain novel features of construction and combinations of parts apparent in the following detailed description of preferred embodiments which represent the best known mode of practicing the invention. This description is made with reference to the accompanying drawings forming a part of the specification.

In the drawings:

FIG. 1 is a perspective view partly in section and with parts broken away and removed showing the combined bearing removing device and safety shield of the present invention applied in operative position to the standard rear axle assembly that has been removed from a conventional automotive vehicle;

FIG. 2 is a top plan view of the tool or bearing removing device of FIG. 1, this view being reduced in size with respect to FIG. 1;

FIG. 3 is a front elevational view of the same tool or device, partly in section with parts removed, this view being drawn to the same scale as FIG. 2; and FIG. 4 is a sectional view through the body of the tool taken substantially on the line 4—4 of FIG. 2, the safety shield and holding springs being removed in this FIGURE.

The present bearing removing device or tool comprises a substantially flat body member 1 having parallel top and bottom surfaces 2, 3 and marginal yoke-shaped reinforcing flange means 5. In FIG. 1, the device is shown applied to a standard rear drive axle assembly of an automotive vehicle in readiness to perform the bearing removing operation for which it is intended. The axle assembly comprises the axle proper, which includes an elongated drive portion 6, most of which is broken away and removed in the drawing, a cylindrical bearing receiving portion 7 and, permanently and rigidly attached to the end of the axle, a circular plate 8. The drive portion 6 of the axle is generally of slightly smaller diameter than the cylindrical bearing receiving portion 7. In the vehicle, the drive portion 6 and the cylindrical bearing receiving portion 7 are enclosed in a tubular housing and the drive portion extends to the differential gearing to which it is drivingly connected as by a splined joint. The outer end of such housing is bored to accommodate outer race 9 of a roller bearing unit that also includes inner race 10 and a number of ball bearings. A closure plate 12 is located on the axle between the bearing unit and the end plate 8, this closure being formed with a central opening 14 for the axle. The closure 12 takes different forms in different automobiles, but customarily has a number of marginal openings 15 to receive screws for securing the closure across the end opening of the tubular axle housing. In operation, the bearing unit may be packed with lubricant and sealed or lubricated by oil from the transmission housing that migrates out the drive portion 6 of the axle. To prevent such oil from escaping, an annular oil seal 16 is provided, this seal may be carried by the closure 12 or, as shown, may be located between the bearing races as part of the bearing unit.

In original assembly, the bearing unit is press fitted onto the cylindrical portion 7 of the axle, being located against a radial shoulder and additionally held in place by a retainer also press fitted onto the axle portion 7. In field servicing of the axle assembly, as in replacing the oil seal or bearing unit, the exerting of an axial load on the bearing unit sufficient to force the inner race 10 and the retainer off the cylindrical portion 7 of the axle has heretofore presented a difficult problem to the ordinary garage mechanic. Common procedure is to fracture the bearing races to facilitate their removal. This is objectionable since, in many cases, only the oil seal is defective yet the fracturing of the bearing races in their removal necessitates their replacement as well as that of the oil seal. Furthermore, the fracturing of the bearing races is a dangerous procedure; the mechanic may be injured by shrapnel-like fragments of a shattering race.

The body of the present device is a steel casting or is fabricated as by welding together steel plate. It is formed with an open ended slot 18 having parallel side edges 19, 20, confronting one another, and an arcuately curved closed end 21 joining the side edges. The slot 18 opens through forward edge 22 of the body member 1, such forward edge being unobstructed or substantially so to facilitate insertion of the body member between the end plate 8 and the closure 12 of the axle assembly. The body member 1 is of generally rectangular configuration and, extending around all of its sides, other than the forward edge 22 is the yoke-shaped reinforcement flange 5. This reinforcement comprises a portion 25 along the curved rear edge of the body member 1 and integral side portions 23, 24 all of which are integrally formed with or rigidly secured to the margins of the body member 1. As shown to advantage in FIG. 4, the rear portion 25 is generally of greater height than the side portions 23, 24 the latter portions tapering from the height of the rear portion to a minimum height adjacent the forward edge 22 of the body member. The greater portion of the reinforcing yoke or flange means 5 is located above the top surface 2 of the body member 1 to facilitate placement of the device about the axle with the thin working area between the end plate 8 and the closure 12.

The body 1 is formed with internally threaded sockets 26, 27 one on either side of the open ended slot 18. The sockets receive screws 28, 29 adapted to bear against the end plate 8 at diametrically located points of the latter. The sockets 26, 27 are so located relative to the slot 18 that a straight line between the sockets crosses the slot intermediate its closed and open ends. Desirably, the metal of the body plate 1 is built up about the sockets 26, 27 in the provision of reinforcing bosses 30 which extend to the yoke 5. The lower or thrust end of each of the screws 28, 29 is formed with a blunt point 31 of about 120° included angle; the upper or drive end of each of the screws is of square or other non-circular section to facilitate turning as by a ratchet wrench or other suitable implement. The axes of the screws 28, 29 are disposed in a common plane which extends transversely across the slot 18 and which is normal to the plane of the substantially flat body member 1. Although the screw axes may be parallel, each normal to the body 1, it is preferable that they be inclined so that their thrust ends 31 converge slightly, each axis being inclined from true normal about 1 to about 3°, 2° being shown in the drawing.

Receivable over the bearing unit is a protective shield 35 in the form of an inverted steel cup. The bottom of the cup is formed with a circular opening 36 through which the axle is received in assembling the cup over the bearing. Thus, when the device is applied to an axle assembly in readiness to remove the bearing unit, the cup shield 35 substantially completely encloses the bearing races, the shield having circular portion 37 which overlies the bearing unit and integral depending annular wall portion 38 which concentrically surrounds the bearing in spaced relation. A plurality of helical coil tension springs 39 extend radially outwardly from the shield 35, their outer ends being secured to anchorage brackets 40 held as by screws 41 to spaced points of the yoke reinforcement 5. The springs 39 are formed with integral end hooks received in suitable holes drilled in the periphery of circular wall 37 of the shield 35 and in the anchorage brackets 40. If desired, the springs may be unhooked to facilitate placement of the device in working relation to the axle assembly and rehooked before the loading of the screws 28, 29 in the bearing removing operation.

With the body 1 of the device inserted between the end plate 8 and the closure 12 of the axle assembly, as shown in FIG. 1, the screws 28, 29 are turned in unison as by ratchet wrenches (not shown) applied to the drive ends 32 and actuated simultaneously by the mechanic holding one of the ratchet wrenches in each hand. As the screws are turned, the points 31 on their lower thrust ends bear against the end plate 8 and portions of the working area of the upper surface 2 of the body member 1 which lie adjacent and about the slot 18 react against the closure 12 and in turn against the bearing unit and the retainer to force the bearing and the retainer upwardly and off the cylindrical portion 7 of the axle. Uniform seating of the closure 12 against the thrust surfaces of the body member 1 is assured by reason of the diametrically related two points of contact of the screws 28, 29 against the end plate 8 of the axle assembly, the body 1 being permitted to tilt about the point contacts in achieving uniform application of axial thrust reaction on the closure 12. Thus, the danger of fracturing the outer bearing race because of uneven application of the axial thrust load in the removal operation is substantially eliminated. However, in the event the bearing race does shatter, because of inherent defect or otherwise, the enclosing cup-shield 35 confines the fragments and prevents injury to the mechanic.

The present invention thus provides a tool of specialized geometry which combines high strength and rigidity with a relatively thin body so that the working area of the body, which is wider than the slot and extends full width to the straight forward edge of the body, can be inserted between the axle closure and the axle end plate. The body member has a minimum substantially uniform thickness over a working area that extends in width at least substantially from one screw to the other and in length from the forward edge of the body to a point beyond the closed end of the slot. The minimum thickness of the body member extends across the entire width of the working area at the forward edge of the body member so as to permit and facilitate the insertion of the body member into the narrow clearance space that exists between the retainer plate and the end plate on the axle assembly. Rigidity is provided by the yoke-shaped reinforcement or flange means which embraces the body member on three sides, being discontinuous across only the forward edge of the body but across the entire width of the working area. The reinforcing flange imparts high strength with low weight because it is generally of greater height than thickness. The reinforcing flange means extends both above and below the body member 1, the major portion of the reinforcement being above the plane of the top surface 2 of the body member. The reinforcement is also several times greater in vertical dimension or height than the maximum thickness of the body member 1, the reinforcement, or at least the main or central portion 22 thereof, having a vertical height at least about three times the thickness of the body member 1. The open ended slot which receives the axle may, by reason of the reinforcement of the body 1 by the yoke 5, be at least four times as wide as the body thickness dimension over the working area. Since the yoke is disposed wholly outside the working area there is minimum interference with any of the axle parts in placing the device for a bearing removing operation and the device is thus adapted for use in disassembling the axles of many different makes and models of vehicles.

The embodiment described is by way of illustration, it being apparent that various changes in structural details may be resorted to without departing from the fundamentals of the invention. It is intended that the patent shall cover, by summarization in the appended claims, all features of patentable novelty residing in the invention.

What I claim and desire to secure by Letters Patent of the United States is:

1. A portable device for convenient use by a mechanic in disassembling an automobile axle assembly of the type comprising an elongated axle having, normal to its axis, a rigidly and permanently attached circular plate, an annular bearing unit press fitted and frictionally held on the axle adjacent the plate, and a centrally apertured flanged closure loosely embracing the axle between the plate and the bearing unit and held captive on the axle by the bearing unit; said device comprising a reaction member including a relatively wide thin generally planar body having rear and spaced side marginal edges and an unobstructed forward edge; the body being formed with a slot having a closed inner end and an outer end opening through a central portion of the forward edge of the body, a yoke embracing and secured to the periphery of the body and having portions disposed along the rear and side edges of the latter, said yoke being continuous about and having its side and rear portions respectively spaced outwardly from the sides and closed end of the slot, screws connected to the body and having thrust ends disposed to bear against the plate of the axle assembly, said screws being actuatable to exert equal and opposite thrust reactions against the plate in one direction and in the opposite direction against the closure and the bearing unit of the assembly, the axes of said screws converging toward their thrust ends, the body providing a working surface several times greater in area than the slot area, the width of the slot being at least four times the thickness of the body throughout the area of such working surface, the forward edge of the body having said thickness throughout its length to facilitate insertion of the body, forward edge first, between the flanged closure and the plate of such an axle assembly with the axle received in the slot through said outer end opening, the device being adapted, upon actuation of said screws, to force such bearing unit off such axle by said opposite thrust reactions, the height dimension of the yoke, measured normal to the plane of the body, being several times the thickness of the body, and the yoke having an inside surface substantially normal to and projecting above the working surface and constituting a shield extending about three sides of a bearing unit being so forced from an axle.

2. A portable device for convenient use by a mechanic in disassembling an automobile axle assembly of the type comprising an elongated axle having, normal to its axis, a rigidly and permanently attached circular plate, an annular bearing unit press fitted and frictionally held on the axle adjacent the plate, and a centrally apertured flanged closure loosely embracing the axle between the plate and the bearing unit and held captive on the axle by the bearing unit; said device comprising a reaction member including a relatively wide thin generally planar body having rear and spaced side marginal edges and an unobstructed forward edge; the body being formed with a slot having a closed inner end and an outer end opening through a central portion of the forward edge of the body, a yoke embracing and secured to the periphery of the body and having upstanding portions spaced outwardly from the slot, the body providing a working surface of greater area than the slot area, the body being insertable, forward edge first, between the flanged closure and the plate of such an axle assembly with the axle received in the slot through said outer end opening, screw means connected to the body, the device being adapted, upon actuation of the screw means, to exert equal and opposite thrust reactions against the plate in one direction and in the opposite direction against the closure and the bearing unit of such assembly to force the bearing unit off the axle, a cup shaped shield receivable in inverted position over the bearing unit of an axle assembly received in the slot, said shield having a bottom formed with an opening accommodating and through which projects the axle of an assembly so received, and the cup shield being smaller in transverse dimension than the space enclosed by the yoke to permit the rim of the inverted cup to move to a position below the upper edge of the yoke whereby fragments of a bearing unit escaping below the cup rim upon shattering of such unit in removal from the axle are confined by the upstanding yoke.

3. A device as defined in claim 2 including means connecting the cup shield to the reaction member to resist separation of the cup shield from such member by thrust forces resulting from such shattering.

4. A device as defined in claim 3 in which the connecting means comprises a spring biasing the cup shield so that it can bear axially against the closure of an assembly so received in the slot of the reaction member.

5. A device as defined in claim 3 in which the connecting means comprises a plurality of springs tensioned between the cup shield and a plurality of points of the reaction member distributed angularly about the axis of an assembly so received in the slot of the reaction member.

6. A device as defined in claim 2 in which the cup shield is of circular form and has a diameter less than the distance between the screws.

References Cited in the file of this patent

UNITED STATES PATENTS

| | | |
|---|---|---|
| 591,164 | Golar | Oct. 5, 1897 |
| 1,130,262 | Duryea | Mar. 2, 1915 |
| 1,163,317 | Brush | Dec. 7, 1915 |
| 1,227,457 | Langan | May 22, 1917 |
| 1,328,663 | Frisz et al. | Jan. 20, 1920 |
| 1,387,553 | Miller | Aug. 16, 1921 |
| 1,443,052 | Stephens | Jan. 23, 1923 |
| 1,930,690 | Oelkers | Oct. 17, 1923 |
| 2,230,918 | Walter | Feb. 4, 1941 |
| 2,253,411 | Thompson | Aug. 19, 1941 |